(12) United States Patent
Bianchi et al.

(10) Patent No.: US 9,791,578 B2
(45) Date of Patent: Oct. 17, 2017

(54) APPARATUS AND METHOD FOR SEISMIC DATA ACQUISITION WITH SIMULTANEOUS ACTIVATION OF CLUSTERED VIBRATORS

(71) Applicant: CGG Services, SA, Massy (FR)

(72) Inventors: Thomas Bianchi, Massy (FR); Julien Meunier, Massy (FR); Olivier Winter, Massy (FR)

(73) Assignee: CGG SERVICES SAS, Massy (FR)

( * ) Notice: Subject to any disclaimer, the term of this patent is extended or adjusted under 35 U.S.C. 154(b) by 7 days.

(21) Appl. No.: 14/786,132

(22) PCT Filed: Apr. 30, 2014

(86) PCT No.: PCT/EP2014/058825
§ 371 (c)(1),
(2) Date: Oct. 21, 2015

(87) PCT Pub. No.: WO2014/177614
PCT Pub. Date: Nov. 6, 2014

(65) Prior Publication Data
US 2016/0077226 A1    Mar. 17, 2016

Related U.S. Application Data

(60) Provisional application No. 61/818,002, filed on May 1, 2013.

(51) Int. Cl.
*G01V 1/00* (2006.01)
*G01V 1/02* (2006.01)
*G01V 1/09* (2006.01)

(52) U.S. Cl.
CPC ............. *G01V 1/005* (2013.01); *G01V 1/09* (2013.01); *G01V 2210/127* (2013.01)

(58) Field of Classification Search
CPC ..... G01V 1/005; G01V 1/09; G01V 2210/127
USPC ........................................ 367/56, 58
See application file for complete search history.

(56) References Cited

U.S. PATENT DOCUMENTS

| | | |
|---|---|---|
| 4,715,020 A | 12/1987 | Landrum, Jr. |
| 6,603,707 B1 | 8/2003 | Meunier et al. |
| 7,050,356 B2 | 5/2006 | Jeffryes |
| 8,451,686 B2 | 5/2013 | Meunier |
| 2006/0034153 A1 | 2/2006 | Meunier et al. |
| 2009/0135671 A1 | 5/2009 | Meunier |
| 2011/0272207 A1 | 11/2011 | Meunier |
| 2011/0305105 A1 | 12/2011 | Dean |
| 2012/0008462 A1 | 1/2012 | Liu et al. |
| 2012/0290213 A1 | 11/2012 | Huo et al. |

OTHER PUBLICATIONS

International Search Report issued in corresponding International application No. PCT/EP2014/058825, date of completion of the International search Jan. 16, 2015.

(Continued)

*Primary Examiner* — Daniel L Murphy
(74) *Attorney, Agent, or Firm* — Patent Portfolio Builders PLLC

(57) ABSTRACT

Methods for seismic exploration of a subsurface formation increase productivity by simultaneously actuating closely located vibratory sources. Individual vibrations generated by different sources actuated simultaneously are encoded to enable separation of seismic data corresponding to each of the individual vibrations.

19 Claims, 7 Drawing Sheets

(56) References Cited

OTHER PUBLICATIONS

Written Opinion of the International Searching Authority issued in corresponding International application No. PCT/EP2014/058825, date of mailing of the International search report Jan. 26, 2015.
Wams, Jan et al., "Recent developments in 3-D acquisition techniques using vibroseis in Oman," The Leading Edge, vol. 17, No. 8, pp. 1053-1063, Tulsa, Oklahoma, USA, DOI: 10.1190/1.438089, Aug. 1998.
Office Action dated Aug. 8, 2017 in related OM Application No. OM/P/2015/000280 (all references cited in OA were previously cited in IDS filed Oct. 21, 2015).

APPARATUS AND METHOD FOR SEISMIC DATA ACQUISITION WITH SIMULTANEOUS ACTIVATION OF CLUSTERED VIBRATORS

CROSS REFERENCE TO RELATED APPLICATIONS

This application claims priority and benefit from U.S. Provisional Patent Application No. 61/818,002, filed May 1, 2013, for "Simultaneous Vibroseis Acquisition," the content of which is incorporated in its entirety herein by reference.

BACKGROUND

Technical Field

Embodiments of the subject matter disclosed herein generally relate to methods for seismic data acquisition using clustered seismic vibrators that are placed at different vibration points within a predetermined distance from one another and are activated simultaneously.

Discussion of the Background

In the oil and gas industry sector particularly, seismic surveys are commonly used to search for and evaluate subterranean hydrocarbon deposits. Seismic surveys are exploration methods that gather and record data related to seismic wave reflections from interfaces between geological layers. Seismic data is then used to create detailed models of the underlying geological structure.

FIG. 1 schematically depicts a land seismic survey system 100 for seismic exploration in a land environment. System 100 includes a source 110 (e.g., a vibratory source) that generates seismic waves, receivers 120 (e.g., geophones) for detecting the seismic reflections, and a recorder 130. Recorder 130 is configured to record electrical signals or seismic data resulting from sampling electrical signals generated by receivers 120 upon detecting seismic reflections. To perform the seismic survey, source 110, receivers 120 and recorder 130 are positioned on ground surface 150. However, source 110 and recorder 130, being carried on trucks, may be repositioned, while receivers 120 are usually arranged over the surveyed geological structure along receiver lines.

In operation, source 110 generates seismic waves that may include a surface waves 140 and body waves 160 that may be partially reflected at an interface 170 between two geological layers inside which the seismic waves propagate with different speeds. Each receiver 120 receives the full wavefield (i.e., both surface and body waves) and converts it into an electrical signal.

Source 110 may be a vibratory source. Vibratory sources are actuated in sweeps lasting generally between 2 and 60 seconds, during which time the vibratory sources generate seismic waves whose frequencies vary over a given range (e.g., 2-200 Hz). Receivers 120 record data for a period during and after the sweep time has ended. This period after the sweep time is known as listening time. During listening time, source 110 may be moved from one location to a next location according to a predetermined survey plan. The locations where seismic sources are activated are known as vibration points.

FIG. 2 illustrates a conventional land survey plan. Seismic receivers 210 (only a few are labeled) are arranged along receiver lines 220, 224, 226. Individual seismic receivers may be deployed along the receiver lines at substantially equal intervals, for example, of about 25 m. Distance between adjacent receiver lines (e.g., 220 to 224, or 224 to 226) may be, for example, about 200 m. The receiver arrangement illustrated in FIG. 2 may be achieved when the surveyed area allows such a layout. However, in practice, the lines may not be parallel straight lines.

Trucks carrying seismic sources 230-241 move along shot lines SL, stopping at successive vibration points. FIG. 2 illustrates a grid of vibration points at intersections of shot lines SL (parallel to receiver lines 220, 224, 226) and lines SN perpendicular to the shot lines SL. A distance between adjacent shot lines may be about 25 m, and a distance between lines SN may be about 50 m. The trucks may use Global Positioning System (GPS) equipment to position the seismic sources at the vibration points according to the survey plan. After a source generates seismic waves according to a predetermined sweep at a vibration point, the truck moves to a next vibration point. Assuming the sources on trucks 230-241 are actuated one after another, a truck has about ¾ minutes to move to a new vibration point. At least one source is ready to be activated at a vibration point when a previous sweep's listening time ends.

A shooting plan includes a large number of vibration points to acquire the information necessary to arrive at conclusions related to the presence and location of subterranean hydrocarbon deposits. Even if the combined sweep and listening time for each one of the vibration points is less than 30 s, acquiring seismic data for all vibration points in a typical survey plan takes a long time, which is expensive in terms of equipment and personnel. Meanwhile, there is a permanent desire to increase vibration points' density to achieve better images of the explored underground structures. Therefore, increasing productivity is an ongoing effort.

One method of increasing productivity of acquiring seismic data known as "slip-sweep" is described in the publication, Wams, J. and Rozemond J. (1998), "Recent Developments in 3-D acquisition using vibroseis in Oman", Leading Edge 17 No. 8, pp. 1053-1063, the content of which is incorporated herein by reference. According to the slip-sweep method, a next sweep starts before the end of listening time related to a previous sweep. The time interval between successive sweeps is known as slip time. However, to be able to separate seismic data corresponding to the different sweeps, slip time is limited by the requirement to avoid overlapping harmonic energy generated during successive sweeps. For example, using the slip-sweep method for a slip time of 5 s with the plan in FIG. 2, a nominal productivity of 720 surveyed points per hour may theoretically be achieved (in practice productivity is only about 600 surveyed points per hour). To separate seismic data corresponding to seismic vibrations produced by different sources, methods described in U.S. Pat. No. 7,050,356 request acquiring data by repeatedly sweeping at the same vibration points with different slip times. In this case, it appears the productivity gained by starting a next sweep before a previous sweep ends is offset by repeating the sweep multiple times.

Some harmonic noise reduction algorithms have been developed, for example, as described in U.S. Pat. No. 6,603,707 and U.S. Pat. No. 8,451,686, the contents of which are incorporated herein by reference. Using these harmonic noise reduction algorithms has allowed productivity to further increase.

Another technique of increasing seismic data acquisition productivity known as "independent simultaneous sweeping" (ISS) is described in U.S. Patent Application Publication No. 2012/0290213, the content of which is incorporated herein by reference. ISS uses statistical methods to remove interference due to unsynchronized overlapping sweeps of sources located at large distances there-between (e.g., 2 km).

However, as ISS separation remains imperfect for a large number of closely spaced sources it remains desirable to enhance the statistical source separation by using acquisition schemes specially designed for separation.

SUMMARY

To increase data acquisition productivity, closely placed vibratory sources (e.g., less than 200 m apart) are actuated simultaneously to generate seismic vibrations encoded so as to enable separation of individual seismic data related to seismic vibrations produced by each of the simultaneously actuated sources.

According to one embodiment, there is a method for seismic exploration of a subsurface formation. The method includes deploying seismic receivers along receiver lines over the explored subsurface formation. The method further includes grouping vibratory sources in clusters so that at least one of the clusters includes several vibratory sources that are placed at less than a predetermined distance from one another while vibrating, the predetermined distance being less than an average distance between adjacent receiver lines. The method also includes actuating the clusters cyclically, so that, in each cycle, the vibratory sources within one of the clusters vibrate during a substantially same sweep time, being encoded to enable separation of recorded seismic data into subsets corresponding to the seismic vibrations.

According to another embodiment, there is a method for seismic exploration of a subsurface formation. The method includes deploying seismic receivers along receiver lines over the explored subsurface formation. The method further includes grouping vibratory sources in clusters, so that at least one of the clusters includes several vibratory sources that are placed less than a predetermined distance from one another while vibrating, the predetermined distance being less than an average distance between adjacent receiver lines. The method also includes actuating the clusters cyclically to produce seismic vibrations propagating in the subsurface formation, so that, in each cycle, the several vibratory sources in the at least one of the clusters vibrate during a substantially same sweep time, to generate seismic vibrations encoded to enable, for vibration frequencies higher than a threshold frequency, separation of recorded seismic data into subsets corresponding to each of the vibratory sources.

According to another embodiment, there is a method for seismic exploration of a subsurface formation. The method includes simultaneously actuating vibratory sources placed at less than 30 m from one another and acquiring seismic data. Here, individual seismic vibrations produced by the vibratory sources are encoded to enable separation of individual seismic data corresponding to at least one of the vibratory sources, from the seismic data, and the encoding is achieved by one of short time static differences, different constant phases and a combination of time and phase differences.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed using terminology of a land data acquisition system. However, similar methods may also be pertinent to marine seismic data acquisition and to data acquisition and processing based on similar approaches, such as measuring electromagnetic or ultrasound responses of an unknown structure to excitations injected into the structure at different locations.

Reference throughout the specification to "one embodiment" or "an embodiment" means that a particular feature, structure or characteristic described in connection with an embodiment is included in at least one embodiment of the subject matter disclosed. Thus, the appearance of phrases "in one embodiment" or "in an embodiment" in various places throughout the specification is not necessarily referring to the same embodiment. Further, the particular features, structures or characteristics may be combined in any suitable manner in one or more embodiments.

To increase productivity, vibratory sources are grouped in clusters of two or more that emit simultaneously (i.e., during substantially the same sweep time). The vibratory sources in a cluster start sweeping at the same time except, in some embodiments, for small static time differences (of 50-1000 ms) used for encoding as explained below (these small static time differences being substantially less than the sweep time and constant along a trace). The seismic vibrations emitted during this sweep time are encoded to enable separation of individual seismic data corresponding to the seismic vibration emitted by each of the vibratory sources in the same cluster. Unlike in ISS methods where unsynchronized overlapping sweeps are produced by distant sources, according to various embodiments, in these embodiments, the vibratory sources are physically close, (e.g., at less than 200 m from one another) and are correlated time-wise.

Figure 1:
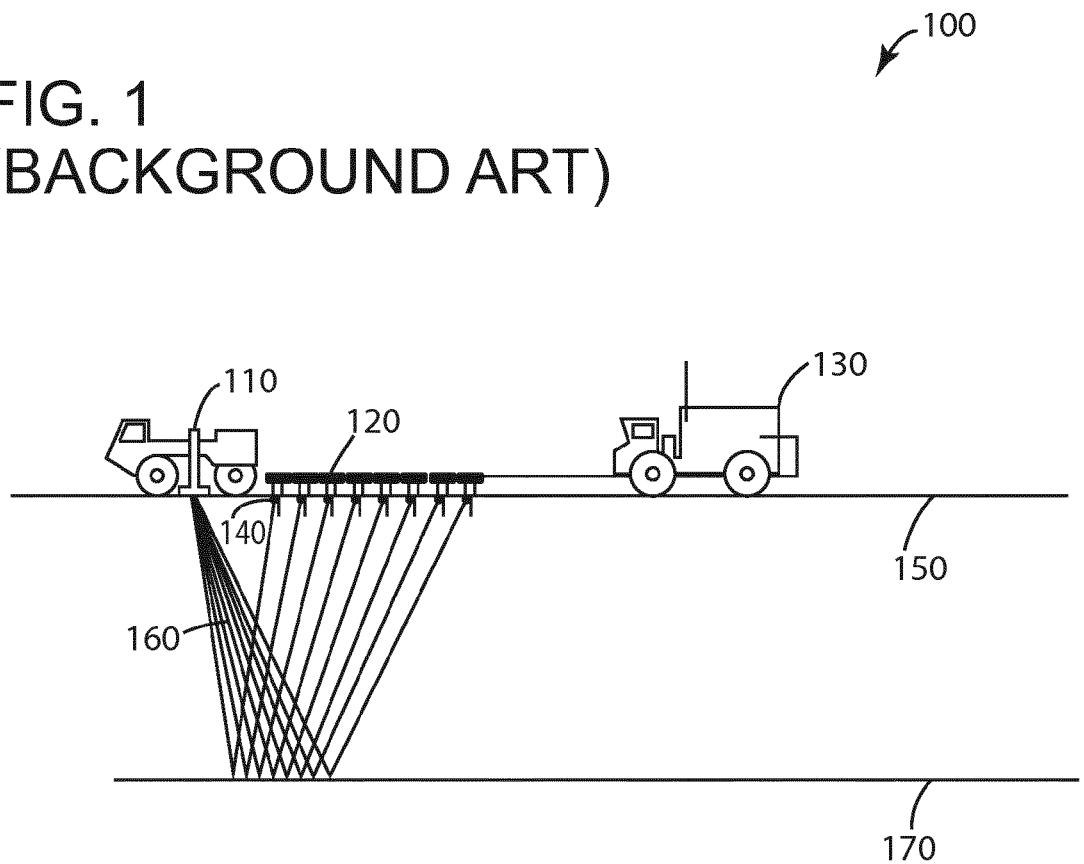
FIG. 1 is a schematic diagram of a land seismic survey system.
Figure 2:
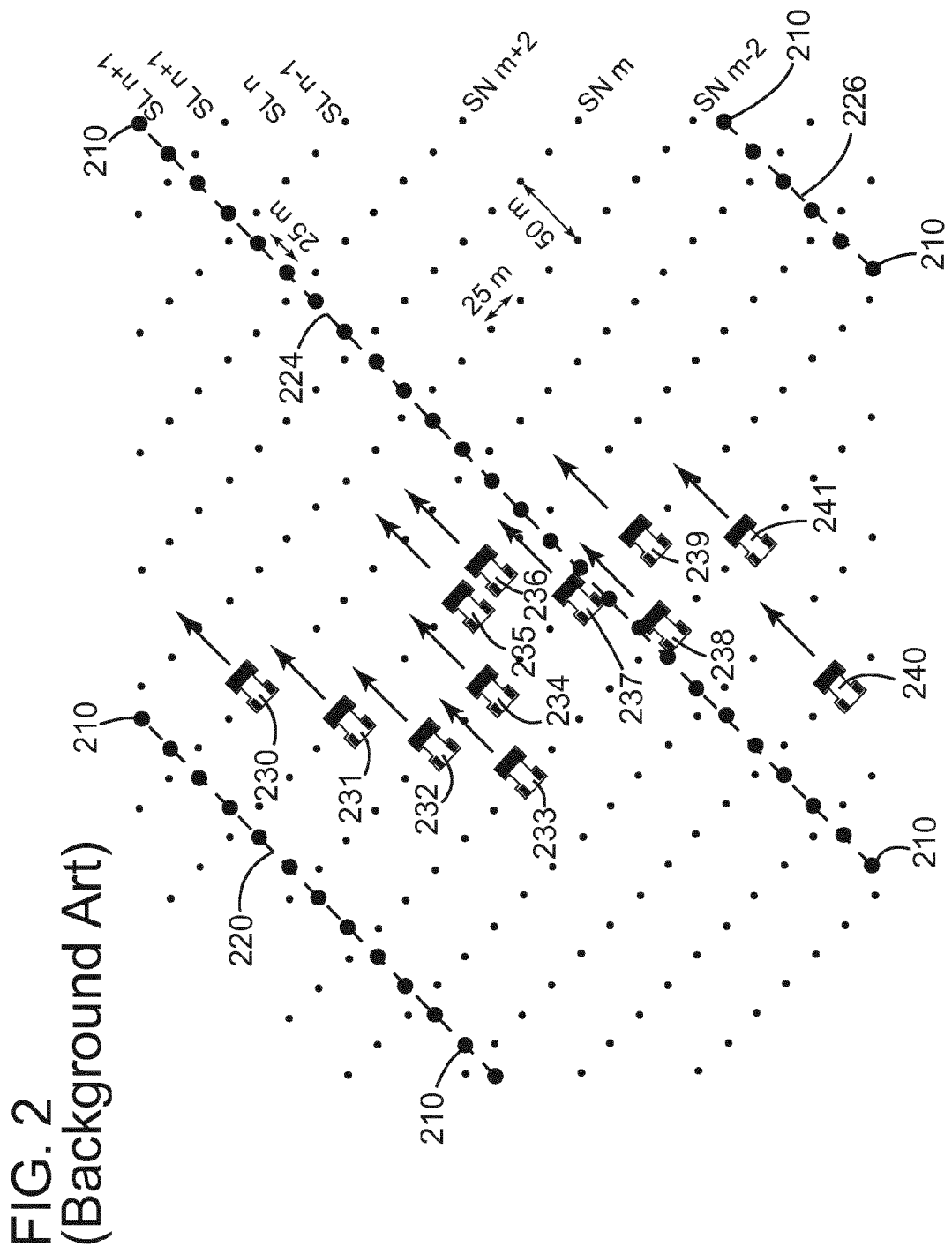
FIG. 2 illustrates a conventional land survey plan.
Figure 3:
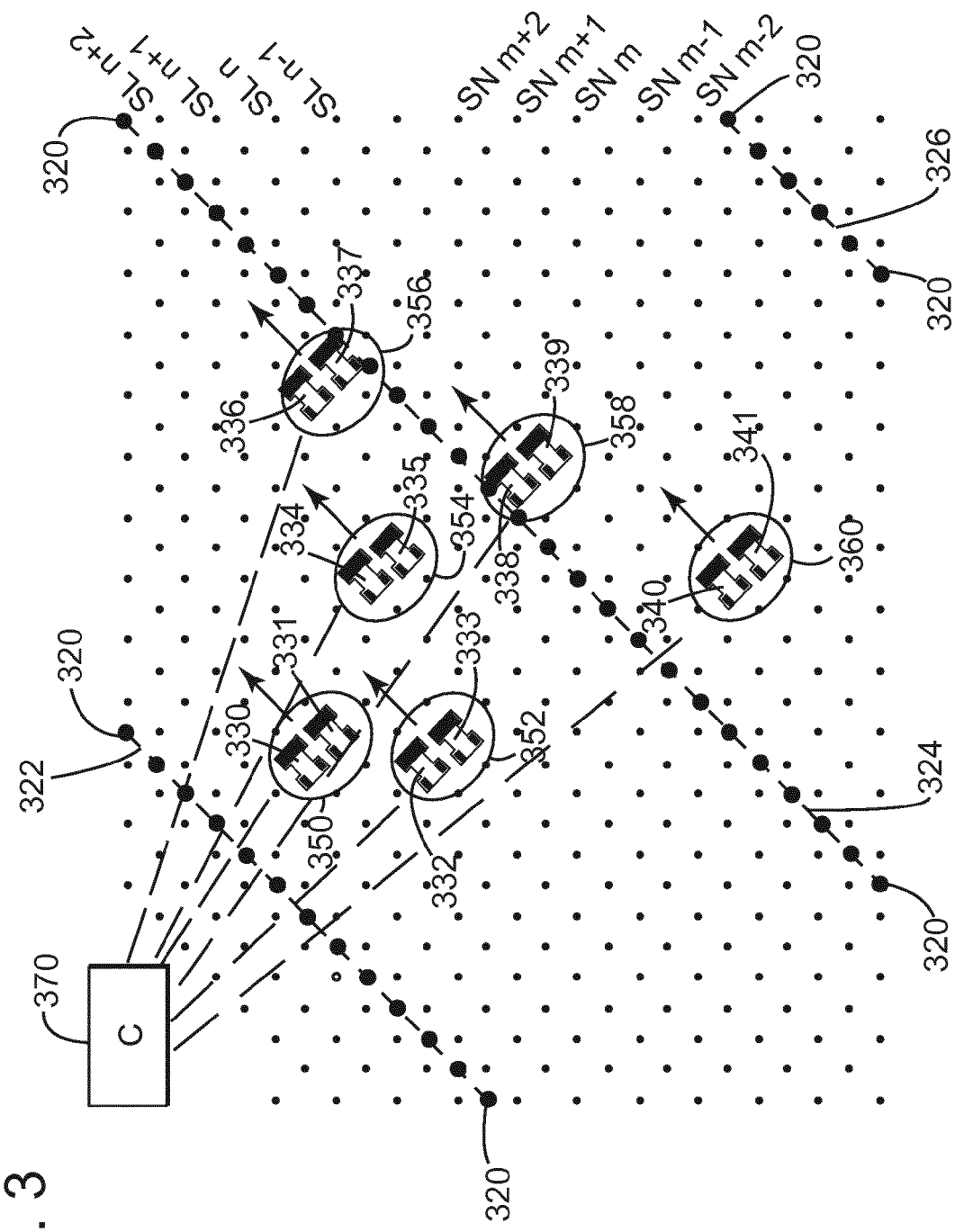
FIG. 3 illustrates a land survey plan according to an embodiment.

FIG. 3 illustrates a land survey plan according to an embodiment. Seismic receivers 320 (only a few are labeled) are arranged along receiver lines 322, 324, 326. Individual seismic receivers may be deployed along the receiver lines at substantially equal intervals of about 25 m. The distance between adjacent receiver lines (e.g., 322 to 324, or 324 to 326) may be about 200 m.

Trucks carrying seismic sources 330-341 move along shot lines SL to place and activate the sources at successive vibration points, a grid of vibration points results from intersecting shot lines SL (parallel to receiver lines 322, 324, 326) with lines SN perpendicular to the shot lines SL. Since, for the embodiment illustrated in FIG. 3, productivity is expected to be double conventional productivity, a distance between adjacent shot lines is 25 m and a distance between lines SN is also 25 m (i.e., increased productivity increases vibration points density for the same survey time). The trucks may use Global Positioning System (GPS) equipment to position the seismic sources at vibration positions according to the survey plan. After a source generates seismic waves according to a predetermined sweep at a vibration position, the truck moves to a next vibration position.

Vibratory sources 330-341 are clustered (i.e., clusters 350, 352, 354, 356, 358, 360) so that sources in the same cluster are actuated simultaneously (i.e., during substantially the same sweep time). Cluster 350 includes sources 330 and 331, cluster 352 includes sources 332 and 333, etc. In FIG. 3, in each cluster, there are only two vibratory sources arranged on different adjacent shot lines. However this arrangement is an illustration and not a limitation. A cluster may include more than two vibratory sources that may be arranged differently (e.g., on the same shot line). The clustered sources are placed close to one another when vibrating, preferably as close as two adjacent vibration points (e.g., 25 m).

The clusters are actuated one after another, cyclically, according to a predetermined sequence or the source activation may be coordinated by a controller 370 (in this case, the sources do not have to be activated cyclically). Sources of at least one cluster are ready to be activated before a listening time corresponding to a previously activated cluster has ended. The sources may remain clustered throughout the survey. However, changes in this arrangement may be triggered by relief or occasional events (e.g., a source malfunction or additional sources).

Figure 4:
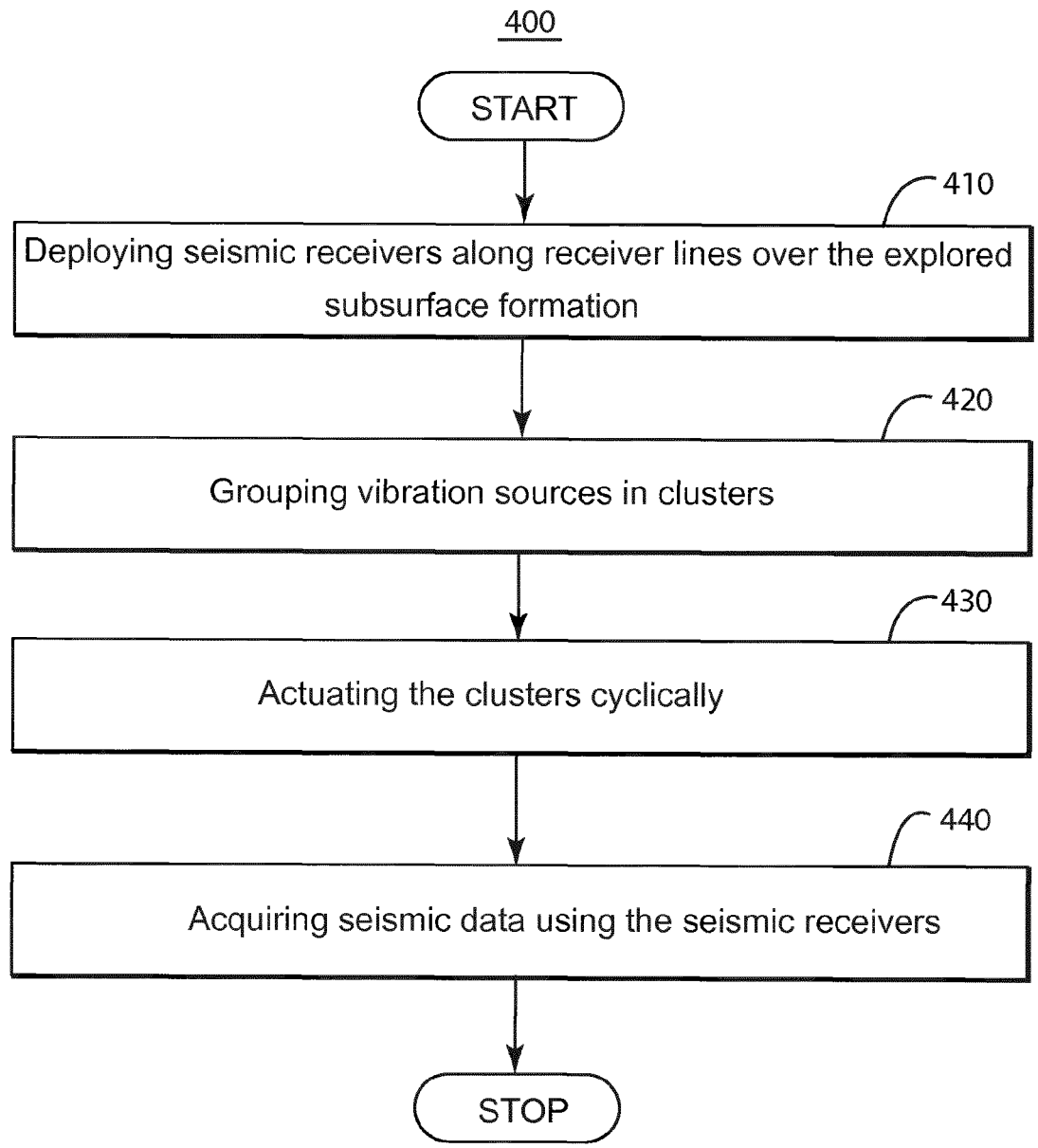
FIG. 4 is a flowchart of a method for seismic exploration of a subsurface formation according to an embodiment.

FIG. 4 illustrates a method 400 for seismic exploration of a subsurface formation, according to an embodiment. Method 400 includes deploying seismic receivers (e.g., 320) along receiver lines (e.g., 322, 324, 326) over the explored subsurface formation, at 410. Step 410 may be performed in preparation for a seismic survey. Sometimes, the receivers are left on the ground for months or even years between successive surveys of a target area.

Method 400 further includes grouping vibratory sources in clusters, at 420. In FIG. 3, each cluster (e.g., 350) includes plural vibratory sources (e.g., cluster 350 includes a first vibratory source 330 and a second vibratory source 331) that are placed within a predetermined distance from one another (e.g., 25 m). However, in a broader view, at least one of the clusters includes plural vibratory sources. The predetermined distance is less than an average distance between adjacent receiver lines such that the same receivers detect reflections of seismic vibration due to the vibratory sources in the same cluster.

Method 400 further includes actuating the clusters cyclically, at 430. During a cycle, each cluster is actuated once. The vibratory sources pertaining to a cluster vibrate during a substantially same sweep time (i.e., as previously discussed, short static time differences much smaller than the sweep time are considered insignificant). The seismic vibrations produced by the vibratory sources in the same cluster are encoded to enable separation of recorded seismic data into subsets, each subset corresponding to one or more of the seismic vibrations.

The seismic vibrations may be encoded by one of short time static differences, different constant phases, a combination of time and phase differences, etc. For example, considering that the vibrations are sinusoidal, first vibrations $Y_1$ corresponding to a first source and second vibrations $Y_2$ corresponding to a second source (where $Y_1$ and $Y_2$ may be pressure or transverse displacement) may be written as:

$$Y_1(t) = A_1(t)\sin(2\pi f_1(t)(t-t_{01}) + \phi_1) \quad (1)$$

and $$Y_2(t) = A_2(t)\sin(2\pi f_2(t)(t-t_{02}) + \phi_2) \quad (2)$$

Where $A_1(t)$ and $A_1(t)$ are maxim amplitude of the first and second vibrations, respectively, $f_1(t)$ and $f_2(t)$ represent individual sweeps (i.e., frequency variation with time for the respective source), t is time, $t_{01}$ and $t_{02}$ are start times of the first and second vibrations, respectively, $\phi_1$ and $\phi2$ are initial phases (which also can be function of time and frequency). If the sweeps of the two vibratory sources are the same then $f_1(t)=f_2(t)$.

If the first seismic vibrations and the second seismic vibrations are encoded via short time static differences, it means that $t_{01} \neq t_{02}$, while $f_1(t)$ may be equal to $f_2(t)$ and $\phi_1 = \phi_2 = 0$.

Figure 5:
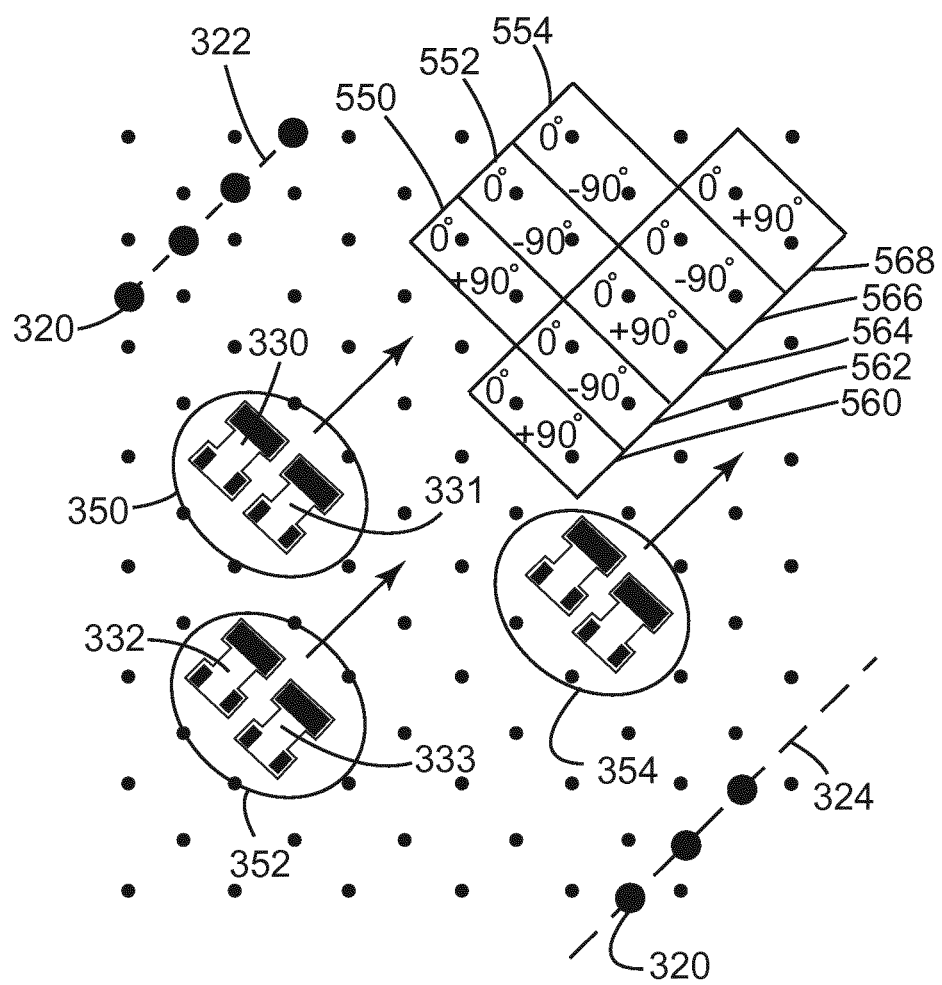
FIG. 5 illustrates phase change from cycle to cycle, according to an exemplary embodiment.

If the first seismic vibrations and the second seismic vibrations are encoded via different constant phases, it means that $\phi_1 \neq \phi_2$ (but $\phi_1$ and $\phi2$ are constant with time or frequency) while $f_1(t)$ may be equal to $f_2(t)$ and $t_{01} = t_{02}$. For example, FIG. 5 illustrates source phases in successive cycles 550-554 for cluster 350, and successive cycles 560-568 for cluster 352. Thus, as illustrated in FIG. 5, if vibrations generated by sources 330 and 332 are considered to be reference vibrations (i.e., having 0° phases), the vibrations generated by sources 331 and 333 have randomly +90° or −90° phase in the respective successive cycles. Thus, the phase difference between the first and second seismic vibrations changes sign randomly in each cycle as illustrated in FIG. 5.

However, in another embodiment, the sign of the phase difference between the first and second seismic vibrations may regularly alternate between +90° or −90° from one cycle to a next cycle. Provided that two adjacent vibrated points have a close enough Earth response, such a phase rotation scheme leads to a well-conditioned linear system of the form: D=φ*E, where E contains the Earth response for each source, D are the recorded shot gathers and $$\varphi = \exp i \frac{\pi}{180°} \begin{pmatrix} 0 & 90° \\ 0 & -90° \end{pmatrix}. \quad (3)$$

One skilled in the art would appreciate that the hypothesis on locality (i.e., adjacent shots have a close reflectivity) is likely to hold in the Radon domain (frequency, slopes) for local transforms.

If the first seismic vibrations and the second seismic vibrations are encoded via a combination of time and phase differences, it means that $\phi_1 = \phi_2$ and $t_{01} \neq t_{02}$ while $f_1(t)$ may be equal to $f_2(t)$.

The above description discusses an embodiment characterized by two-source clusters. However, in other embodiments, one or more clusters may have more than two sources. For example, in an embodiment with three-source clusters, source phases may rotate, taking, for example, values of $$\begin{bmatrix} 120 & 0 & 0 \\ -120 & 0 & -120 \\ 0 & 0 & 120 \end{bmatrix}$$

for three consecutive shot locations (i.e., the constant phases are pre-determined according to geographical shot locations). In this matrix, each line corresponds to a successive vibration of the clustered sources.

Additionally, FIGS. 3 and 5 illustrate clusters having the same number (2) of sources. This is an illustration and not a limitation. For example, one embodiment may include clusters having different numbers of sources and more than two sources. Moreover, in one embodiment, individual sources grouped together in clusters may vary from cycle to cycle (e.g., in a cycle, a vibratory source is clustered with an adjacent vibratory source positioned at left relative to a source's moving direction, and, then, in a next cycle, the vibratory source is clustered with an adjacent source positioned at right relative to the source's moving direction).

Since encoding makes it possible to separate (i.e., extract from the acquired seismic data) the first seismic data corresponding to the first vibrations and the second seismic data corresponding to the second seismic vibrations, each vibratory source is moved from a vibration point to a next vibration point during each cycle (i.e., unlike in U.S. Pat. No. 7,050,356 where data for multiple repeated sweeps with different parameters are acquired to perform such a separation).

The clustered sources may be selected to be as close as possible from one another. Related to this feature, in one embodiment, no vibratory source of a cluster may be intercalated between vibratory sources of any other cluster.

Similar to the method described in U.S. Pat. No. 8,451,686 for individual sources, in each cycle, the clusters may be activated at one of a series of times defined relative to the beginning of the cycle. The time intervals between successive times in the series may be substantially equal. In one embodiment, the clusters are activated in the same order in each cycle. In another embodiment, the clusters are activated in a different order in successive cycles (granted that sources in a cluster have time to move to new vibration points before being re-activated in a new cycle).

The above embodiments of simultaneous activation of clustered sources that are physically close may be combined with the slip-sweep method. Thus in one embodiment, at least one of the clusters starts vibrating before the end of seismic receivers' listening time for a previously actuated cluster. In this case, the acquired seismic data may be processed first to extract individual cluster seismic data. For example, an algorithm similar to the one described in U.S. Pat. No. 8,451,686 (HPVA) may be used to extract the individual cluster seismic data. The resulting individual cluster seismic data is then processed to separate the first data and the second data.

In a test run using the survey plan in FIG. 3 and a slip time of 5 s, nominal productivity of 1,440 surveyed points per hour was theoretically possible, and productivity of over 1,000 surveyed points per hour was achieved.

Lately, extending the sweep frequency spectrum toward low frequencies (less than 10 Hz) has been considered advantageous. However, in order to be able to separate those low frequencies, the methods are restricted to the use of large static time shifts, which may be counterproductive. At those frequencies, two closely located vibratory sources (i.e., at a distance less than for example ¼ of low-frequency vibrations' wavelength) can emit simultaneously and in phase such that they have the effect of a single source.

According to another embodiment, a sweep of the clustered vibratory sources includes (A) a first period during which the first vibratory source and the second vibratory source in the same cluster have the same phase and vibrate with low frequencies less than or equal to a threshold frequency, and (B) a second period during which the first vibratory source and the second vibratory source have different phases and vibrate with frequencies higher than the threshold frequency. The seismic vibrations produced by different clustered seismic sources (emitting simultaneously) are then encoded to enable separation of seismic data corresponding to individual seismic vibrations at the frequencies higher than the threshold frequency. The advantage of this embodiment is that more low frequency signal is recovered. The signal to noise ratio of frequencies below the threshold will increase by a factor equal to the square root of the number of sources in the cluster, compared to the previous embodiments where phase and shifts are not equal for the whole sweep.

During the second period, the seismic vibrations emitted by different clustered sources may be encoded by one of short time static differences, different constant phases, and a combination of time and phase differences. In one embodiment, during the second period, seismic vibrations emitted by different clustered sources have different constant phases, but phase differences may change randomly in each shooting cycle.

Figure 6:
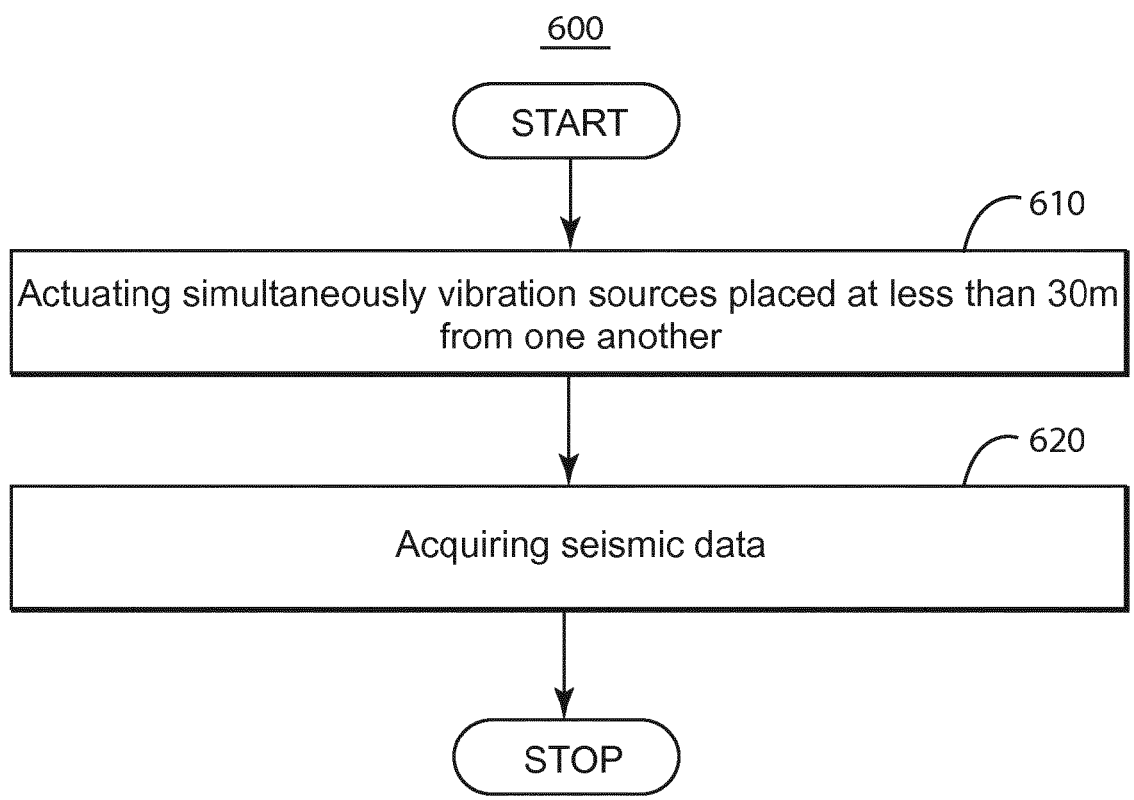
FIG. 6 is a flowchart of a method for seismic exploration of a subsurface formation according to another embodiment.

FIG. 6 illustrates a method 600 for seismic exploration of a subsurface formation according to another embodiment. Method 600 includes actuating simultaneously vibratory sources placed less than 30 m from one another, at 610. Individual seismic vibrations produced by each of the vibratory sources are encoded to enable separation of individual seismic data corresponding to individual seismic vibrations. The individual seismic vibrations are encoded by one of short time static differences, different constant phases, and a combination of time and phase differences. Method 600 further includes acquiring seismic data at 620.

Figure 7:
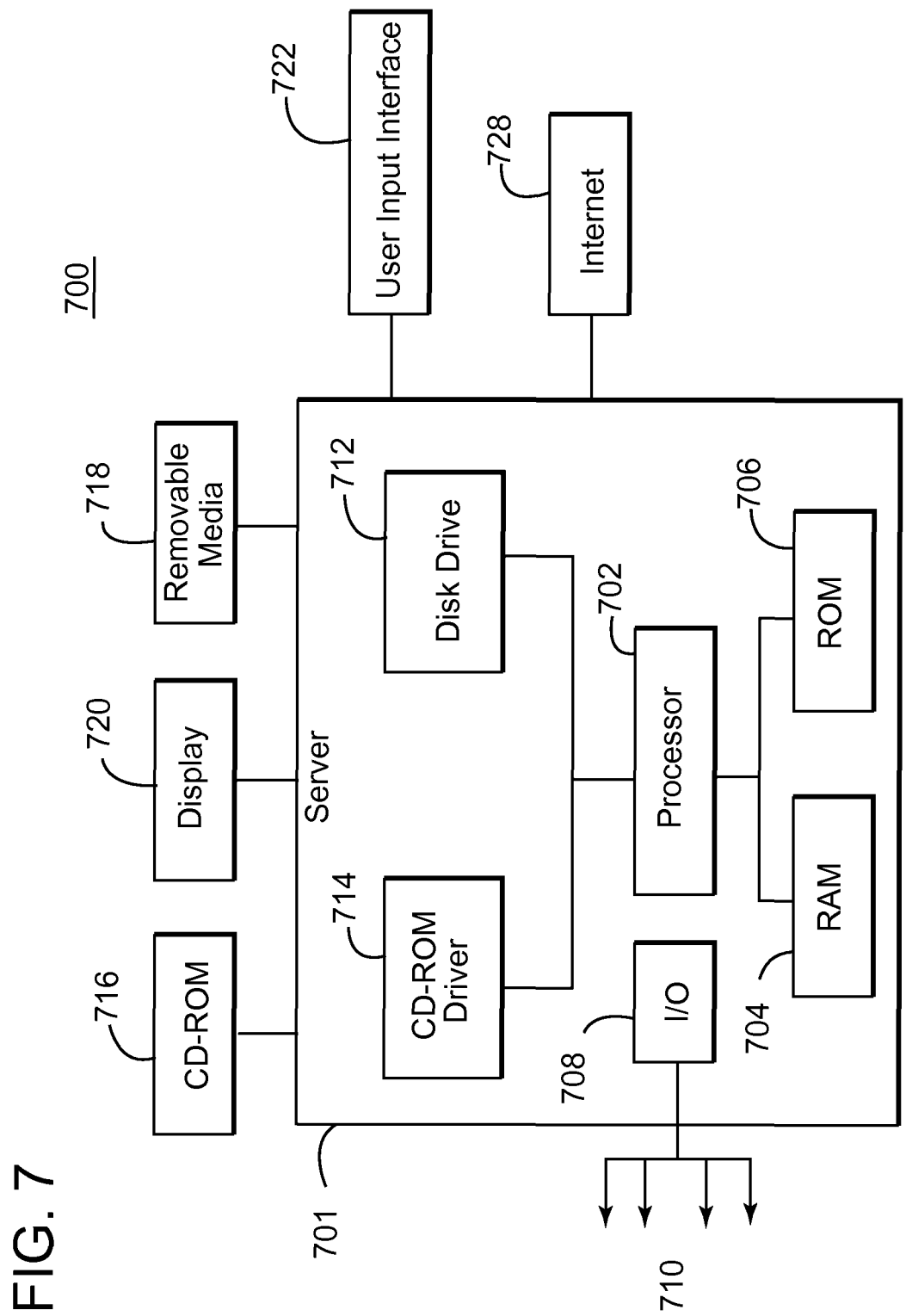
FIG. 7 is a block diagram of a controller according to one embodiment.

Returning now at FIG. 3, controller 370, which is configured to cluster the vibratory sources and to actuate them, may be a combination of software and hardware as illustrated in FIG. 7. Hardware, firmware, software or a combination thereof may be used to perform the various steps and operations. Controller 700, which may also be carried by a truck, may include server 701 having a central processor unit (CPU) 702 coupled to a random access memory (RAM) 704 and to a read-only memory (ROM) 706. The ROM 706 may also be other types of storage media to store programs, such as programmable ROM (PROM), erasable PROM (EPROM), etc. Methods for clustering and actuating vibratory sources according to various embodiments described in this section may be implemented as computer programs (i.e., executable codes) non-transitorily stored on RAM 704 or ROM 706.

Processor 702 may communicate with other internal and external components through input/output (I/O) circuitry 708 and bussing 710, to provide control signals and the like. For example, processor 702 may communicate with the sensors, electro-magnetic actuator system and/or the pressure mechanism of each source element. Processor 702 carries out a variety of functions as are known in the art, as dictated by software and/or firmware instructions. Server 701 may also include one or more data storage devices, including disk drives 712, CD-ROM drives 714, and other hardware capable of reading and/or storing information, such as a DVD, etc. In one embodiment, software for carrying out the above-discussed steps may be stored and distributed on a CD-ROM 716, removable media 718 or other form of media capable of storing information. The storage media may be inserted into, and read by, devices such as the CD-ROM drive 714, disk drive 712, etc. Server 701 may be coupled to a display 720, which may be any type of known display or presentation screen, such as LCD, plasma displays, cathode ray tubes (CRT), etc. Server 701 may control display 720 to exhibit images based on the acquired seismic data. A user input interface 722 is provided and may include one or more user interface mechanisms such as a mouse, keyboard, microphone, touch pad, touch screen, voice-recognition system, etc.

Server 701 may be coupled to other computing devices, via a network. The server may be part of a larger network configuration as in a global area network (GAN) such as the Internet 728, which allows ultimate connection to the sources, receivers, data storage unit, etc.

The disclosed embodiments provide methods of seismic data acquisition according to which clustered (i.e., physically close) sources are actuated simultaneously. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in particular combinations, each feature or element may be usable alone without the other features and elements of the embodiments or in other various combinations with or without other features and elements disclosed herein.

The written description uses examples of the subject matter disclosed to enable any person skilled in the art to practice the same, including making and using the described devices or systems and performing any of the described methods. The patentable scope of the subject matter is defined by the claims, and may include other examples that occur to those skilled in the art. Such examples are intended to be within the scope of the claims.

What is claimed is:

1. A method for seismic exploration of a subsurface formation, the method comprising:
   deploying seismic receivers along receiver lines over the explored subsurface formation;
   grouping vibratory sources in clusters, so that at least one of the clusters includes several vibratory sources that are placed at less than a predetermined distance from one another while vibrating, the predetermined distance being less than an average distance between adjacent receiver lines; and
   actuating the clusters cyclically, so that, in each cycle, the vibratory sources within one of the clusters vibrate during a substantially same sweep time, vibrations of the vibratory sources pertaining to the one of the clusters being encoded to enable separation of recorded seismic data into subsets corresponding to the seismic vibrations.

2. The method of claim 1, wherein each of the vibratory sources is moved from a vibration point to a next vibration point during each cycle.

3. The method of claim 1, wherein the vibrations of the vibratory sources of the one of the clusters are encoded by one of short time static differences, different constant phases and a combination of time and phase differences.

4. The method of claim 1, wherein vibrations of the vibratory sources in the one of the clusters have constant phases pre-determined according to geographical shot locations.

5. The method of claim 1, wherein the vibratory sources in the one of the clusters vibrate according to a same sweep pattern.

6. The method of claim 1, wherein no vibratory source of the one of the clusters is intercalated between vibratory sources of any other one of the clusters.

7. The method of claim 1, further comprising:
   acquiring the recorded seismic data using the seismic receivers; and
   separating the recorded seismic data into the subsets such that each subset corresponds to one of the vibratory sources.

8. The method of claim 1, wherein in each cycle, the clusters are activated at one of a series of times defined relative to a beginning of the cycle.

9. The method of claim 8, wherein the clusters are activated in same order in each cycle.

10. The method of claim 8, wherein the clusters are activated in different order in successive cycles.

11. The method of claim 8, wherein time intervals between successive of the times in the series are substantially equal.

12. The method of claim 1, wherein at least one of the clusters starts vibrating before a listening time corresponding to a previously actuated cluster has ended.

13. The method of claim 12, further comprising:
   extracting individual cluster seismic data from the recorded seismic data.

14. A method for seismic exploration of a subsurface formation, the method comprising:
   deploying seismic receivers along receiver lines over the explored subsurface formation;
   grouping vibratory sources in clusters, so that at least one of the clusters includes several vibratory sources that are placed less than a predetermined distance from one another while vibrating, the predetermined distance being less than an average distance between adjacent receiver lines; and
   actuating the clusters cyclically to produce seismic vibrations propagating in the subsurface formation, so that, in each cycle, the several vibratory sources in the at least one of the clusters vibrate during a substantially same sweep time, to generate seismic vibrations encoded to enable, for vibration frequencies higher than a threshold frequency, separation of recorded seismic data into subsets corresponding to each of the vibratory sources.

15. The method of claim 14, wherein
   the sweep time includes (A) a first period during which the several vibratory sources vibrate simultaneously with one or more low frequencies that are less than or equal to the threshold frequency, and (B) a second period during which the several vibratory sources are encoded and vibrate with vibration frequencies higher than the threshold frequency, and
   the threshold frequency corresponds to a wavelength exceeding the predetermined distance.

16. The method of claim 15, wherein, during the second period, the several seismic vibrations are encoded by one of short time static differences, different constant phases and a combination of time and phase differences.

17. The method of claim 15, wherein, during the second period, the seismic vibrations have constant phases predetermined according to the geographical shot locations.

18. The method of claim 14, wherein
the several vibratory sources vibrate according to a same sweep pattern, and
each of the several vibratory sources is moved from a vibration point to a next vibration point during each cycle.

19. The method of claim 14, wherein at least one of the clusters starts vibrating before a listening time during which the seismic receivers listen for seismic reflections due to a previously actuated cluster has ended.

* * * * *